US012715352B2

(12) United States Patent
Kock et al.

(10) Patent No.: US 12,715,352 B2
(45) Date of Patent: Aug. 25, 2026

(54) FOLDING TABLE ARRANGEMENT FOR A VEHICLE

(71) Applicant: Inteva Products Europe GmbH, Solingen (DE)

(72) Inventors: Niklas Kock, Sprockhoevel (DE); Andreas Rahn, Radevormwald (DE); Stefan Wiepen, Schwerte (DE)

(73) Assignee: INTEVA PRODUCTS EUROPE GMBH, Solingen (DE)

( * ) Notice: Subject to any disclaimer, the term of this patent is extended or adjusted under 35 U.S.C. 154(b) by 117 days.

(21) Appl. No.: 18/763,103

(22) Filed: Jul. 3, 2024

(65) Prior Publication Data

US 2025/0010781 A1 Jan. 9, 2025

(30) Foreign Application Priority Data

Jul. 6, 2023 (DE) ......................... 102023117792.3

(51) Int. Cl.
*B60N 3/00* (2006.01)
*B64D 11/06* (2006.01)

(52) U.S. Cl.
CPC .......... *B60N 3/001* (2013.01); *B64D 11/0638* (2014.12)

(58) Field of Classification Search
CPC ..... B64D 11/0638; B60N 3/001; B60N 3/002
See application file for complete search history.

(56) References Cited

U.S. PATENT DOCUMENTS

| | | | | |
|---|---|---|---|---|
| 9,896,011 | B2 | 2/2018 | Kong et al. | |
| 11,433,795 | B2 | 9/2022 | Wiepen et al. | |
| 2020/0131813 | A1* | 4/2020 | Wiepen | B60R 7/04 |
| 2022/0227277 | A1* | 7/2022 | Dueker | B60N 3/002 |
| 2022/0363176 | A1* | 11/2022 | Nageshkar | B60N 3/063 |

FOREIGN PATENT DOCUMENTS

| | | | | |
|---|---|---|---|---|
| CN | 218141193 U | 12/2022 | | |
| DE | 102011117003 A1 * | 4/2013 | | B60N 3/002 |
| DE | 102015226812 A1 | 12/2016 | | |
| DE | 102019006076 A1 * | 2/2020 | | B60N 3/002 |
| DE | 112019003621 T5 | 4/2021 | | |

* cited by examiner

*Primary Examiner* — Matthew W Ing
(74) *Attorney, Agent, or Firm* — CANTOR COLBURN LLP

(57) ABSTRACT

An electrically operated folding table arrangement for a vehicle, in particular a motor vehicle, includes a base carrier, a support arm assembly coupled to the base carrier and including a support arm which is pivotally mounted about a first pivot axis, and a table top assembly which is coupled to the support arm and is pivotable relative to the support arm about a second pivot axis. The table top assembly includes a holding arm hinged to the support arm and a table top rotatably mounted on the holding arm about a rotational axis. Each pivot axis is assigned a drive device with a motor device for driving and controlling the respective pivotal movement about the respective pivot axis. A further motor-assisted drive device can be provided for driving and controlling the rotational movement of the table top about the rotational axis.

18 Claims, 9 Drawing Sheets

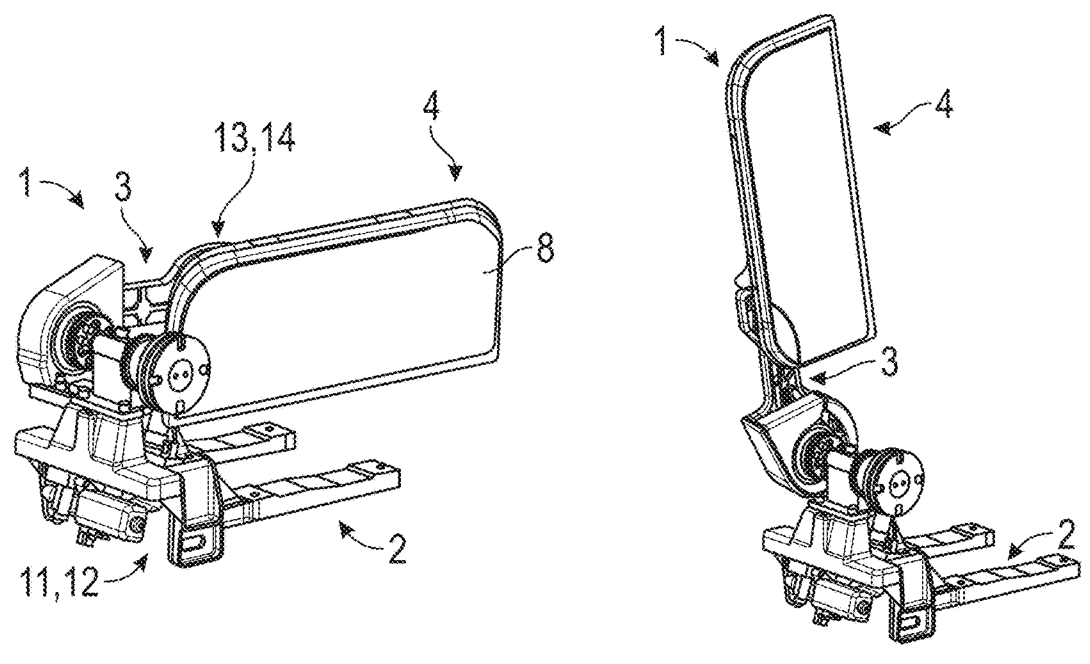
FIG. 2A
FIG. 2B
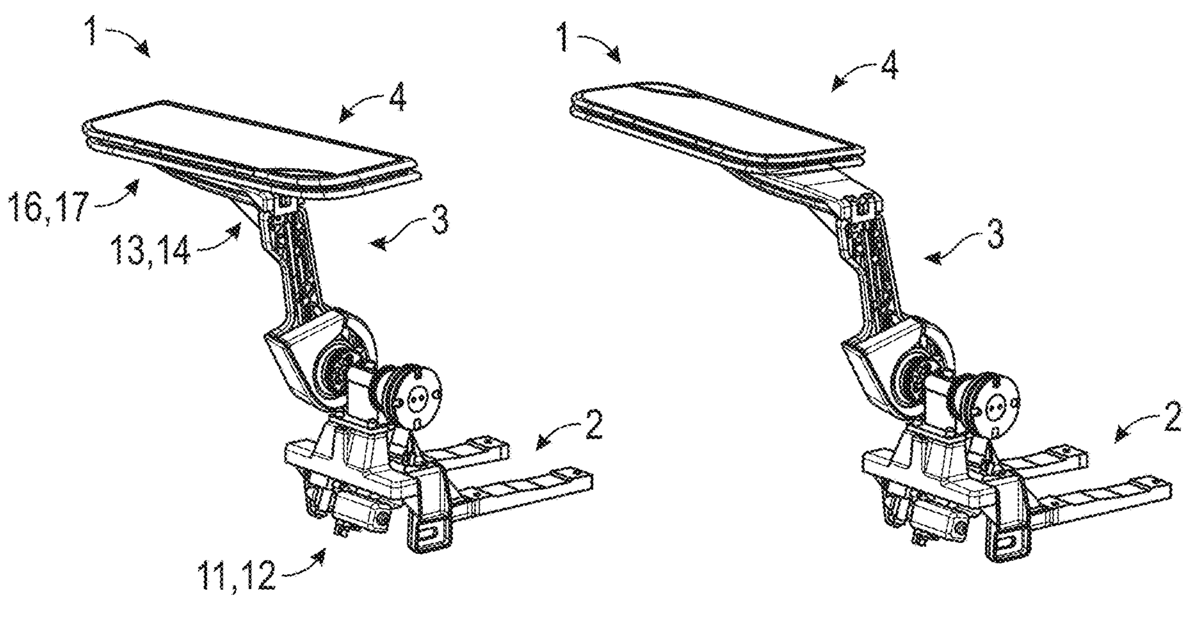
FIG. 2C
FIG. 2D

FOLDING TABLE ARRANGEMENT FOR A VEHICLE

CROSS REFERENCE TO RELATED APPLICATIONS

This application claims priority under 35 U.S.C. § 119 to the following German Patent Application No. 10 2023 117 792.3, filed on Jul. 6, 2023, the entire contents of which are incorporated herein by reference thereto.

TECHNICAL FIELD

The present disclosure relates to a folding table arrangement for a vehicle. In particular, the present disclosure relates to a folding table arrangement for a vehicle, such as a motor vehicle, aircraft or railroad vehicle, which is installed at a seat arrangement of the vehicle and can be used comfortably by a person sitting on a seat of the seat arrangement during operation of the vehicle.

BACKGROUND

In the case of motor vehicles in particular, there is an increasing desire among automotive customers for greater flexibility and adaptability of the vehicle interior, resulting in the need to provide vehicles that meet the broader customer requirements. For example, longer driving distances and the amount of time spent in a vehicle have resulted in consumers increasingly demanding vehicle interiors that allow for activities such as working, playing, or food consumption. For this purpose, table top assemblies arranged in the vehicle can be used.

Such table top assemblies are particularly suitable for rear passengers of motor vehicles and may be installed, for example, in a rear seat console between a left and right seat of a rear seat arrangement. Preferably, such table arrangements can be folded into a storage space and stowed therein and folded out or unfolded into their functional position only when needed. Table top assemblies may also be desired for the driver or passenger. For example, with increasing semi-autonomous or assisted driving of a vehicle, a driver will have more times in which he or she has fewer driving tasks to perform and can therefore devote himself or herself to secondary activities for which the presence of a table is helpful in some cases. Therefore, there is an increasing need for folding table arrangements that can be folded in and stowed away or folded out and used as required. In addition to user comfort, the focus is on easy and flawless operability, robustness and durability as well as appealing aesthetics as requirements for such folding table arrangements.

Such flexible folding table arrangements may also be desirable or indispensable for increasing comfort in railroad vehicles or aircraft, especially those with higher classes of transportation, e.g. in 1st class railroad cars or in the business class or first class of an aircraft.

DE 10 2015 228 812 A1 describes a folding table arrangement installed in a console compartment of a rear seat console of a vehicle, which is provided with an armrest for pivotally closing the console compartment. With the armrest folded up, the folding table can be pulled out of the console compartment via a rotary arm, whereupon a table top can be unfolded and rotated into a desired position. The position of the folding table can be adjusted in each case to suit the position of a vehicle occupant seated to the left or right of the rear seat console. When not in use, the folding table arrangement can be retracted again, pushed into the console compartment by turning the rotary arm and stored in the console compartment so that it is invisible to the outside.

Although the known folding table arrangement can provide the comfort needed for the passengers and offers good functionality, the operation or handling of the folding table arrangement can be difficult. A passenger wishing to use the table assembly must be familiar with the process of extracting and unfolding the table from the console compartment to the position of use, and the reverse process of folding and stowing the table in the console compartment, on the one hand to prevent incorrect operation and possible damage to components of the folding table arrangement and on the other hand to minimize the risk of injury when operating the folding table arrangement. In addition, it may be cumbersome for a rear seat passenger to orient himself or herself properly with respect to the rear seat console, fold up the armrest, grasp the folding table arrangement, and apply sufficient force thereto to pull the folding table arrangement out of the console compartment, then unfold and rotate it to the desired position or to stow the folding table arrangement again. A coil spring may be provided to provide a restoring force biasing the rotary arm to assist in unfolding the table assembly. In order to stow the table structure, however, the user must then apply an additional force to overcome the restoring force of the coil spring.

BRIEF SUMMARY

Based on this, it is an object of the present disclosure to provide a folding table arrangement for a vehicle that allows for easy handling and great comfort for the user. Preferably, the folding table arrangement should be easy to set up and stow, flexible in use, robust and durable, and have a relatively simple structure that can be aesthetically designed.

In order to achieve this object, the present disclosure provides a folding table arrangement for a vehicle, in particular a motor vehicle, comprising: a base carrier; a support arm assembly coupled to the base carrier and including a support arm which is pivotally mounted about a first pivot axis and which can be pivoted between a retracted and an extended position, the support arm assembly being assigned a first drive device which includes a first motor device for driving and controlling the pivotal movement of the support arm about the first pivot axis relative to the base carrier; and a table top assembly coupled to the support arm, the table top assembly being pivotally arranged relative to the support arm about a second pivot axis different from the first pivot axis, wherein the table top assembly is pivotable between a folded position and an unfolded position, the table top assembly including a second drive device including a second motor device for driving and controlling the pivotal movement of the table top assembly about the second pivot axis relative to the support arm, the table top assembly comprising a holding arm hinged to the support arm and a table top rotatably mounted on the holding arm about a rotational axis different from the first pivot axis and the second pivot axis.

The present disclosure provides at least a first motorized drive device for pivoting the support arm assembly relative to the base carrier and a second motorized drive device for the table top assembly in order to fold and unfold it relative to the support arm. Using the first motor device, the support arm can be automatically moved from a fully retracted position stowed in a storage space to a position extended from the storage space, in which the support arm assembly protrudes from the base carrier, for example substantially vertically upwards, and vice versa. The second motor device additionally provides for an automated unfolding movement of the table top assembly between a folded position in which the table top is arranged substantially in one line or coplanar with the support arm, and an unfolded position which is a position pivoted substantially 90° with respect to the folded position, in which the table top is oriented with its longitudinal direction substantially perpendicular to the support arm, in both directions of the folding movement. All these movements of the support arm assembly and the table top assembly do not require any effort or assistance from the user at all. The user can easily, quickly and conveniently control the operations by means of a controller, for example by pressing appropriate buttons on a control panel, a remote control or other means. The handling is extremely simple and minimizes the risk of operating errors with associated risks of damage to the folding table arrangement, to vehicle components and to the operator.

In one embodiment of the present disclosure, the base carrier comprises two parallel carrying legs which are connected to one another via a cross member, the cross member having a receiving space for accommodating the first motor device. The carrying legs may be arranged for attachment to a vehicle floor, for example the body substructure, or the floor below a seat in an aircraft, in particular an airplane, or in a railroad car. The cross member may provide sufficient space to accommodate two motor devices for two folding table arrangements for two adjacent seats.

In preferred embodiments, the first motor device is designed as a worm gear motor with a first motor, in particular a direct current motor, and a preferably non-self-locking worm gear on the motor side. The worm gear motor is well suited for high torques at low speeds and can withstand high loads. In addition, worm gears impress with their high efficiency at low noise and relatively vibration-free, smooth running for long-lasting operation, which makes them particularly suitable for the present application. Preferably, the worm gear on the motor side is purposefully designed not to be self-locking to enable emergency unlocking.

The first drive device may further comprise a drive shaft, one end of which is drivingly connected to the worm gear motor and the other end of which is drivingly connected to the support arm assembly via a further worm gear on the support arm side, in order to pivot the support arm about the first pivot axis relative to the base carrier, when the worm gear motor is actuated. The advantages of the worm drive apply accordingly to the further worm gear on the support arm side.

The worm gear motor may be mounted slightly rotated about its axis so that the drive shaft runs at a slight angle to the front (as viewed from the user in the installed condition) in the operating state in order to reduce space requirements. When two motors for two tables arranged side by side are accommodated in a common base carrier, the two motors may preferably be arranged partially one above the other in the receiving space of the base carrier and rotated slightly, and the drive shafts may have different lengths and, in the operating state, run obliquely forward and upward to minimize installation space.

It is advantageous if the further worm gear on the support arm side is designed as a self-locking gear, so that a stepless tilt adjustment is possible, while a stable position of the support arm assembly with the table top relative to the support arm can be maintained in any desired tilted position of use and even when external forces are applied.

In advantageous embodiments, the self-locking gear transmission may have a worm mounted on the drive shaft, on which means may be arranged that may be gripped from the outside with a tool in order to manually operate the further worm gear on the support arm side. As a result, the table can be retracted back into the retracted position for emergency unlocking with a tool, for example with the aid of a hex wrench or the like, using these means, e.g. screws, if necessary.

In a preferred embodiment, the support arm assembly comprises a main axis and at least one driver element rotatably mounted on the main axis, which is driven in rotation by the first drive device and is firmly connected to the support arm in order to convert a rotational movement from the first drive device into a pivotal movement of the support arm. The support arm may be fixed to the driver element in a non-positive and/or positive manner. In some embodiments, the support arm may be clamped between an inner driver element and an outer driver element and connected to them in a non-positive and/or positive manner with the aid of a fixing block and the like. In further advantageous embodiments, the inner driver element can be formed integrally with the support arm, as a single component. The inner driver element is then part of the support arm, such that no fixing means and assembly steps are required here.

Stop means may be provided in order to limit a pivoting range of the support arm about the first pivot axis. For example, the stop means can be formed by cylindrical pins fastened in a worm wheel of the further worm gear on the supporting arm side, which stop means run against one or more counter pins fixed to the main axis. There is a travel range of the support arm around the first pivot axis of more than 90°, preferably 90° to 110°, particularly preferably about 100°. Any travel range, which can also be less than 90° or more than 110°, may be set.

No stop is required for a desired tilt adjustment of the table, e.g. by about 30° or the like. The self-locking of the further worm gear on the support arm suffices. If necessary, however, stop means may also be provided for this purpose.

In advantageous embodiments, spring means may be provided in order to support pivoting of the support arm relative to the base carrier. For example, spring means may be arranged and configured to support the motor-driven pivoting of the support arm in the sense of an extending movement at least in a certain range. The spring means may be arranged to be progressively tensioned as the table is retracted, thereby ensuring a smoother, jerk-free or less jerky retracting movement, while the spring means assists the motor by spring force when the table is extended.

In special effective constructions of the last-mentioned embodiments, the spring means may comprise a coil spring which is suspended at one end in the main axis of the support arm assembly and the other end of which bears against the support arm. The coil spring is installed slightly preloaded so that it is under tension and acts against the support arm throughout the range of movement of the support arm. During the retracting movement, the coil spring is increasingly tensioned, thereby assisting in a smooth and jerk-free movement when retracting the table. When extending the table, the coil spring supports the motor with its spring force.

In particularly preferred embodiments, further spring means can be arranged and configured to support a motor-driven pivoting of the support arm in the sense of a retracting movement at least in a certain range. The further spring means may be arranged to be tensioned when the table is extended and to assist the motor when the table is retracted to ensure a smoother, jerk-free or less jerky retracting movement.

In special constructions, the further spring means may comprise a further coil spring which is suspended at one end in a driver element of the support arm assembly and the other end of which is configured to bear against a rigid bearing section. In the retracted state, the further coil spring may be arranged with little play with respect to the rigid bearing section in order to only come into effect in the later part of an extending movement and, in particular, to counteract the motor force at the end of the extending movement in order to ensure a smooth, jerk-free extending movement and also to effectively suppress any swinging up or overshooting of the support arm when reaching the fully extended position. Conversely, the first coil spring counteracts the motor force when reaching the fully retracted position in order to effectively suppress any swinging up or overshooting of the support arm. Both spring means in combination thus prevent the table from moving beyond its center of gravity when reaching one of the end positions due to inertia, motor drive and spring tension. Both spring means also make it possible to avoid or at least reduce a stick-slip effect or jerk-slip when the support arm is retracted or extended.

In principle, other types of spring means, apart from coil springs, may also be used in order to fulfill the functions mentioned above. Instead of or in addition to the spring means, suitable damping means could also be provided in order to counteract overshooting of the support arm or the table top assemblies. However, the coil springs allow for a simple, robust construction and have proven to be particularly effective and advantageous.

The second motor device for driving and controlling the pivotal movement of the table top assembly about the second pivot axis relative to the support arm may be designed in a variety of ways, for example likewise with a worm gear motor, a rotary axis and a worm drive. In an advantageous embodiment, it is designed as a threaded spindle drive with a motor, in particular a direct current motor, and a threaded spindle driven in rotation by the motor, which interacts with a spindle nut coupled to the holding arm of the table top assembly in order to convert a rotational movement of the threaded spindle into a linear movement of the spindle nut. A simple, robust and efficient linear drive may be provided.

In addition, the second drive device may include a supporting beam which is hinged at one end to the support arm and is relatively pivotally and slidably connected at its other end to the holding arm of the table top assembly via a joint. Furthermore, the supporting beam is drivingly connected to the spindle nut via the joint so as to be displaced by the spindle nut along the holding arm. When the motor of the second motor device rotates, the spindle nut runs over the threaded spindle and thus entrains the supporting beam, thereby unfolding and folding the table top assembly. During the unfolding movement and in particular in the unfolded position, the table top assembly is supported by the supporting beam in a secure and stable manner against the support arm.

Preferably, the motor of the second motor device can be arranged to switch off if predefined maximum motor current limits are exceeded upon reaching end positions at which the spindle nut is prevented from being moved further linearly. The motor runs until it reaches the respective end position and switches off via the current limit. An anti-trap protection may also be implemented via a current limit. Such overcurrent protections are generally known and are often already integrated in an electric motor as motor protection devices for protection against thermal overload.

In order to increase safety, in advantageous embodiments, a switch may be arranged and configured to be actuated when the table top assembly is in an unfolded position. Then, when the switch is actuated, retraction of the table in the unfolded position may be prevented. A mechanical switch or an electrical or electronic switch may be provided, which supplies a signal, for example to a control, to prevent retraction of the table in the unfolded position. For this purpose, various switches, such as contact switches, reed contacts, Hall sensors and the like, may be used.

In some embodiments, the switch may be attached to the support arm, and the support arm may further support a movably arranged, in particular longitudinally displaceably guided push rod, which is arranged and configured to engage the table top assembly at one end when the table top assembly is in the unfolded position, and to thereupon actuate the switch with its other end. As previously mentioned, other types of switches, including mechanical, electrical and electronic, contact and non-contact switches are possible as needed.

In order to further facilitate operability and to offer additional comfort, the table top assembly may further include a third drive device comprising a third motor device for driving and controlling rotational movement of the table top about the rotational axis relative to the holding arm. Thus, rotational positioning of the table top may also be operated electrically or motor-driven.

The third drive device may in particular comprise a third motor with a preferably self-locking third worm gear. This allows the set rotational position of the table top to be kept relatively stable.

Advantageously, a slipping clutch may be arranged between the third worm gear and the table top to allow the table top to be rotated relative to the third motor device, in particular relative to a worm wheel of the third worm gear, by an external force. When an external force with a certain minimum load is applied to the table top, the table top can be stopped or even rotated in the opposite direction to the rotating direction of the third motor despite the operation of the third drive device, so that a passenger can be prevented from being injured upon motor operation or upon impact caused by the passenger colliding with the table top. The slipping clutch also makes it possible to quickly manually adjust the rotational position of the table top at any time.

Although different embodiments are possible for the slipping clutch, in a particularly simple embodiment the slipping clutch comprises a damping device which preferably includes at least one O-ring interposed between the third worm gear and the table top, in particular between the worm wheel of the third worm gear and the table top. A plurality of O-rings may also be provided as a damping device. The worm wheel is connected to the table top via the O-ring(s) in a sufficiently non-rotatable manner so that the table top is carried along when the worm wheel is rotated. However, a user has the ability to stop or manually rotate the table top as required. This also provides an anti-trap protection.

In embodiments of the present disclosure, the third drive device may further include at least one end position switch so that the table is rotated by the third motor via the third worm gear until the motor switch for the end position is reached. The third motor then switches off automatically. Should a passenger hold the table top, the third motor may be configured in such a way that it continues to rotate only for a defined period of time and then switches off automatically. An end position switch is preferably assigned to each direction of rotation.

Further advantageous embodiments of the present disclosure will be apparent from the claims, from the following description of preferred embodiments, and from the drawings.

BRIEF DESCRIPTION OF THE DRAWINGS

The drawings show in no way limiting exemplary embodiments of the subject-matter of the present disclosure. As far as possible, the same reference signs are used in all figures to designate the same parts or components, in which case, unless otherwise specified, the statements apply accordingly to all figures. In the drawings:

FIGS. 2*a*-2*d* show the folding table arrangement of FIG. 1 in perspective views in different positions between a retracted and folded position (FIG. 2*a*) and an extended and unfolded position (FIG. 2*d*);

DETAILED DESCRIPTION

Figure 1:
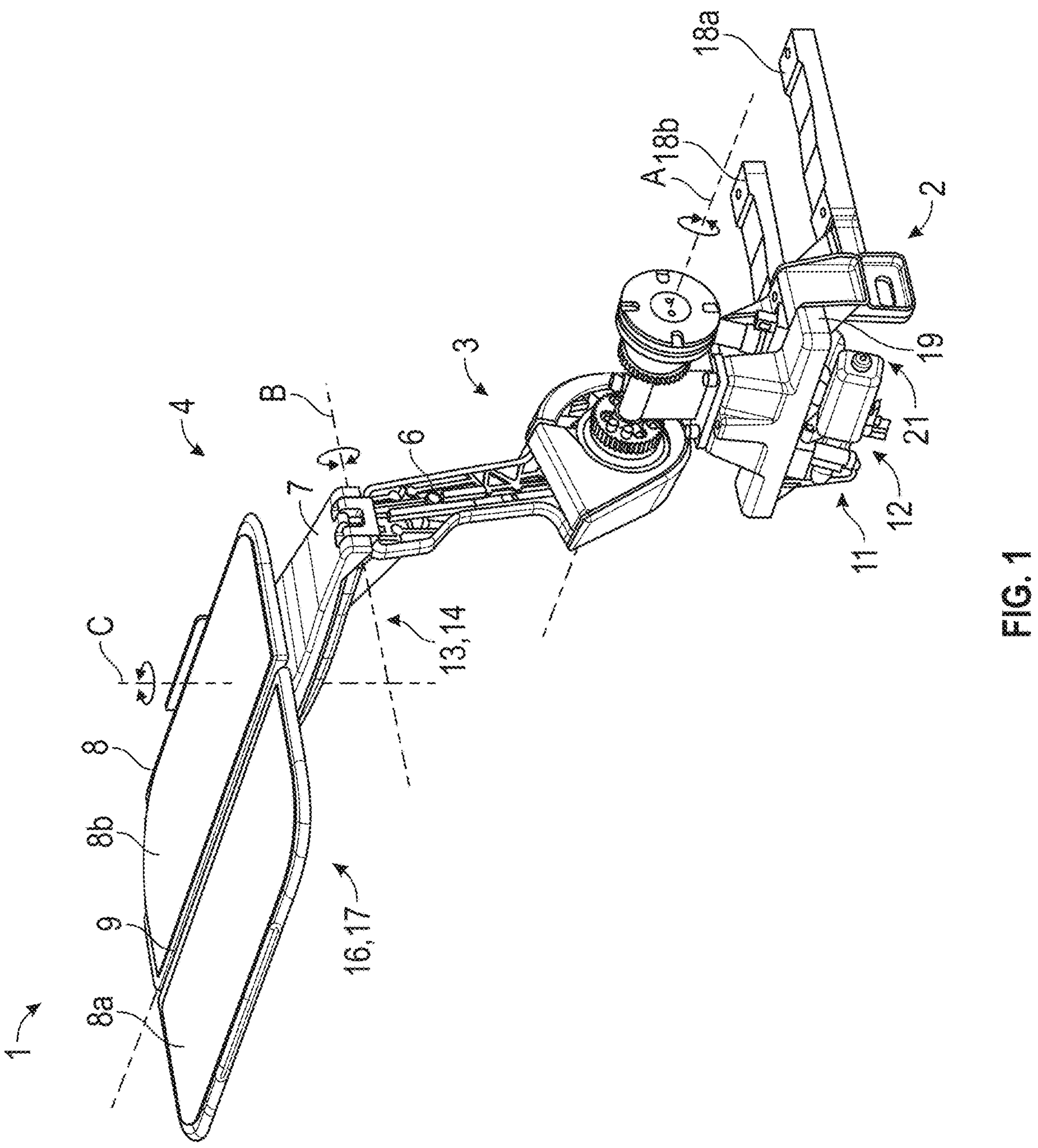
FIG. 1 is a perspective view of an embodiment of a folding table arrangement according to the present disclosure in a position of use.

FIGS. 1 and 2*a*-2*d* show a folding table arrangement 1 for a vehicle according to the present disclosure, which is particularly suitable for use in a motor vehicle and may be installed, for example, in a rear seat console of a motor vehicle in order to enable a user, a passenger or vehicle occupant, sitting in the rear seat to use the folding table arrangement comfortably. In principle, the folding table arrangement could also be arranged for the front seats of a motor vehicle. It may also be used in other vehicles in which passengers are transported on seats, such as in aircraft, in particular airplanes, railroad vehicles or ships. In FIG. 1, the folding table arrangement 1 is illustrated in a fully extended and unfolded position of use, while FIGS. 2*a*-2*d* illustrate the folding table arrangement 1 in other positions.

According to FIG. 1, the folding table arrangement 1 comprises a base carrier 2, a support arm assembly 3 coupled to the base carrier 2, and a table top assembly 4 coupled to the support arm assembly 3. The support arm assembly 3 comprises a support arm 6 pivotally mounted about a first pivot axis A, the support arm 6 being pivotable between a fully retracted position, as shown in FIG. 2*a*, and a fully extended position, as shown in FIG. 1 and in FIGS. 2*b*-2*d*. In the retracted position shown in FIG. 2*a*, the support arm assembly 3 is arranged in a horizontal position, with the table top assembly 4 spanning a substantially vertical plane and being coplanar, parallel to the support arm 6. In this position, the support arm assembly 3 and the table top assembly 4 may be accommodated, for example, in a storage space that is defined in the vicinity of the base carrier 2 and is not shown in detail herein. In the extended position according to FIG. 1 and FIGS. 2*b*-2*d*, the support arm assembly 3 with the table top assembly 4 protrudes substantially vertically upwards from the storage space to support the table top assembly 4 at the top. A housing, not shown herein, could be mounted around the base carrier 2 to define the storage space. The storage space could also be the interior of a rear seat console, for example.

The table top assembly 4 is arranged to be pivotable or foldable relative to the support arm 6 about a second pivot axis B different from the first pivot axis A, such that the table top assembly 4 is pivotable between a folded position and an unfolded position. In the folded position, as shown in FIGS. 2*a* and 2*b*, the table top assembly 4 is substantially in line or coplanar with the support arm 6, while in the unfolded position, as shown in FIGS. 1, 2*c* and 2*d*, the table top assembly 4 is pivoted by substantially 90° relative to the folded position, so that the table top assembly 4 is oriented with its longitudinal direction substantially perpendicular to the support arm 6 and is arranged substantially horizontally overall. The second pivot axis B is oriented substantially perpendicular to the first pivot axis A. However, the exact orientation of the second pivot axis B depends on the rotational position of the support arm assembly 3.

The table top assembly 4 further comprises a holding arm 7, which is hidden in FIG. 1 and is shown in more detail in FIGS. 12-16 and which is hinged to the support arm 6, and a table top 8 which is rotatably mounted on the holding arm 7 about a rotational axis C different from the first pivot axis A and the second pivot axis B. In the fully extended and unfolded position shown in FIGS. 1, 2*c* and 2*d*, the rotational axis C is oriented perpendicular to the first pivot axis A and to the second pivot axis B. The rotational axis C may intersect or be slightly offset from the first pivot axis 1 and is also offset and spaced apart from the second pivot axis B.

However, the pivot axes A, B may be freely defined and need not be designed as in the exemplary embodiment.

In the illustrated embodiment, the table top 8 is of divided construction and comprises a first table top half 8*a* and a second table top half 8*b*, which are pivotally connected to one another at their longitudinal sides by a hinge 9. Thus, the table top halves 8*a*, 8*b* can optionally be folded open, as illustrated in FIG. 1, to provide a table top 8 with a larger surface area, or they can be folded closed, as illustrated in FIGS. 2*a*-2*d*, to reduce the table surface area or to be stowed in the storage space. Versions with a one-piece table top are also possible.

According to the present disclosure, the folding table arrangement 1 comprises several motor-assisted drive devices which make it possible to pivot the support arm assembly 3 and the table top assembly 4 and preferably also to rotate the table top 8 into the desired position, in order to transfer the folding table arrangement 1 from the retracted and folded, stowed initial position shown in FIG. 2*a* to the fully extended and unfolded position of use according to FIG. 1 and vice versa. For the sake of simplification of the description, the process of transferring the folding table arrangement 1 from the stowed initial position to the position of use is also referred to as "setting up" the folding table arrangement 1, while the reverse process is also briefly referred to as "stowing" the folding table arrangement 1.

As may be seen from FIG. 1, the drive devices include a first drive device 11, which is assigned to the arm assembly 3 and comprises a first motor device 12 for driving and controlling the pivotal movement of the support arm 6 about the first pivot axis A relative to the base carrier 2. The drive devices also include a second drive device 13, which is provided on the table top assembly 4 and comprises a second motor device 14 for driving and controlling the pivotal movement of the table top assembly 4 about the second pivot axis B relative to the support arm 6. In addition, the table top assembly 4 includes here an optional third drive device 16 shown in more detail in FIGS. 12-16, which comprises a third motor device 17 for driving and controlling the rotational movement of the table top 8 about the rotational axis C relative to the holding arm 7.

Figure 3:
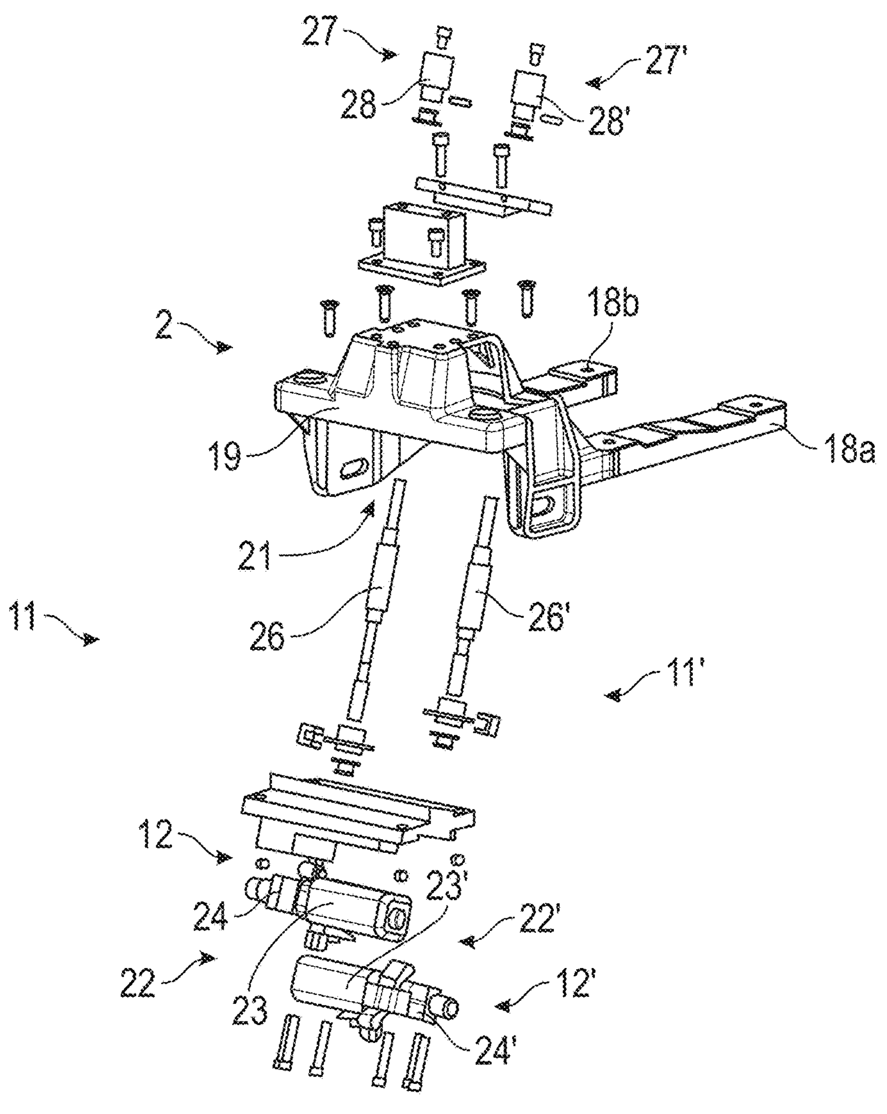
FIG. 3 shows an embodiment of a base carrier and a first drive device for a support arm assembly of a folding table arrangement according to the present disclosure in an exploded view.
Figure 4:
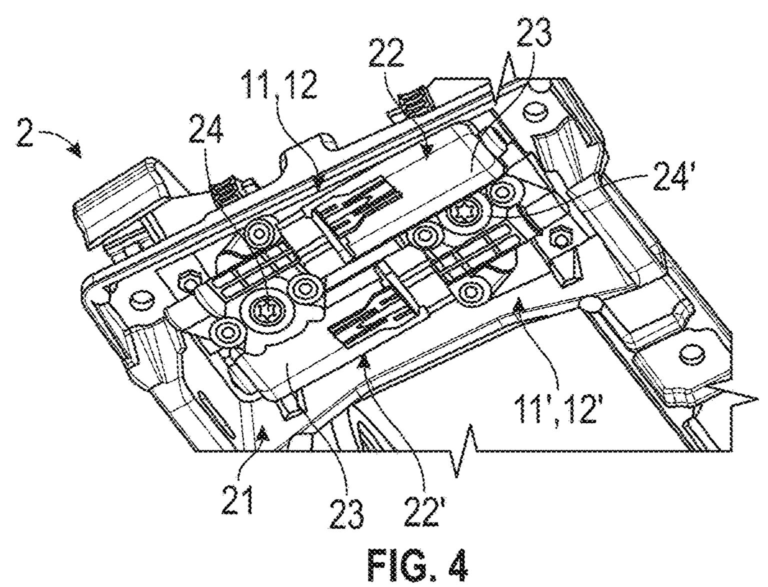
FIG. 4 shows the base carrier from FIG. 3 with first motor devices accommodated therein in a partial perspective view.

The components of the folding table arrangement 1 according to the present disclosure shown in FIG. 1 will now be explained in more detail with reference to FIGS. 3-16. Referring first to FIG. 3, the base carrier 2 and essential components of the first drive device 11 are shown therein. The base carrier 2 comprises two parallel carrying legs 18*a*, 18*b* which are intended to be mounted on a floor of a vehicle, for example in a rear seat console of a motor vehicle, or on a floor under a seat in an aircraft or railroad car, to secure and hold the folding table arrangement 1 in a stable manner. The carrying legs 18*a*, 18*b* are connected to one another via a cross member 19 which defines at its lower side a receiving space 21 for receiving the first motor device 12. In FIG. 4, which shows the cross member 19 with the receiving space 21 as viewed from below, the first motor device 12 is illustrated as installed in the receiving space 21.

The first motor device 12 is advantageously designed herein as a worm gear motor 22 including a first motor 23, a direct current motor, and a preferably non-self-locking first worm gear 24. The worm gear motor 22 can provide high torques at low speeds, withstand high loads, and offer relatively quiet and vibration-free operation, which is advantageous for the comfort applications contemplated herein. It is robust and well suited for long-life operation. Preferably, the first worm gear 24 in the worm gear motor 22 is purposefully designed not to be self-locking so that an emergency unlocking is feasible.

Figure 6:
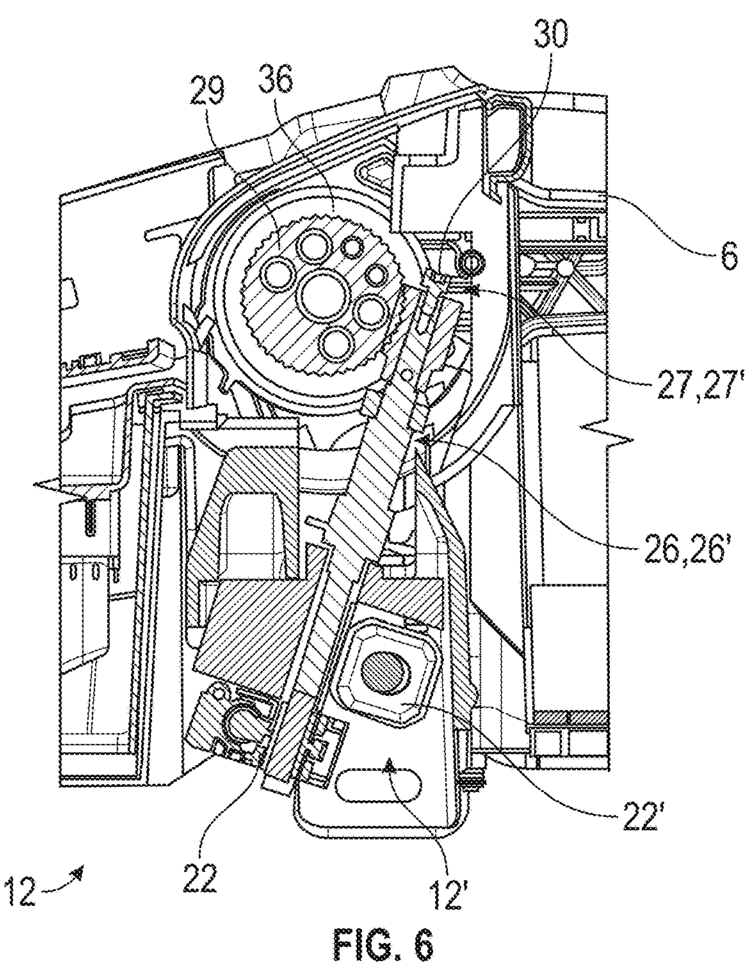
FIG. 6 is a cross-sectional detail view illustrating the first drive device for the support arm assembly of the folding table arrangement, in a closeup representation.

With further reference to FIG. 3, the first drive device further includes a drive shaft 26 having one end, the lower end in FIGS. 3, 4 and 6, drivingly connected to the first worm gear 24 and the other end, the upper end in the FIGS. 3 and 6, of which is drivingly connected to the support arm assembly 3 via a further worm gear 27 to pivot the support arm 6 about the first pivot axis A relative to the base carrier 2 when the worm gear motor 22 is actuated.

The further worm gear 27 on the support arm side is preferably designed as a self-locking gear and has a worm 28 which meshes with a worm wheel 29 provided on the support arm assembly 3. The further worm gear 27, which is at the top in the figures, can be specifically designed to be self-locking in order to enable stepless tilt adjustment and to securely maintain a stable position of the support arm assembly 3 with the table top 8 relative to the base carrier 2 in the position of use at any tilt, even when external forces are applied.

For an emergency unlocking, means 30 may be provided which can be gripped from the outside with a tool in order to manually operate the further worm gear 27. As may be seen in particular from FIGS. 5 and 6, such an emergency unlocking means 30 can be, for example, a screw, e.g. an Allen screw, fixed to the worm 28, which screw can be turned by means of a tool, in particular a hex key, in order to manually turn the worm 28 and thus manually pivot the entire support arm assembly 3 with respect to the base carrier 2, if necessary.

Figure 5:
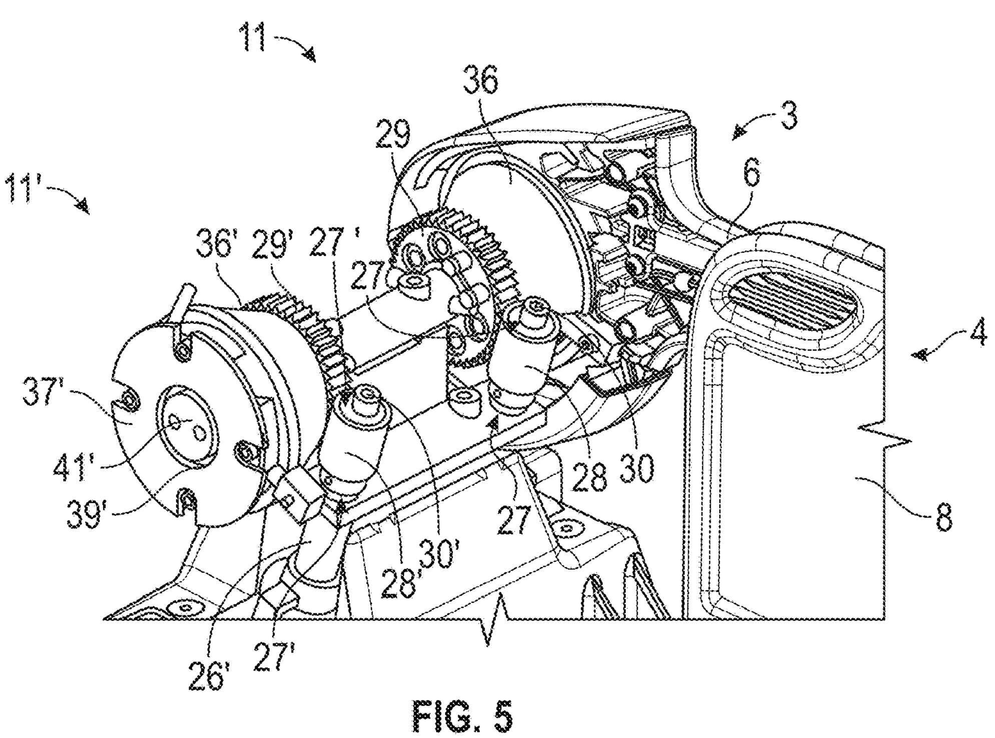
FIG. 5 is a partial perspective view illustrating a part of the first drive device in interaction with the support arm assembly for a folding table arrangement according to FIG. 1.

As may also be seen from FIGS. 3-5, a further first drive device 11' may be mounted on the base carrier 2 in order to operate a further table top assembly not shown herein, in particular to extend it from and retract it into the base carrier 2. The further table top assembly may be associated with an adjacent seat, for example in a rear seat arrangement of a motor vehicle. The further first drive device 11' then comprises a further first motor device 12' with a further worm gear motor 22', a further drive shaft 26' and a further worm gear 27' with a further worm 28' and a further worm wheel 29'.

As may be seen in particular from FIGS. 3-6, each worm gear motor 22, 22' may be mounted slightly rotated about its axis, so that the drive shaft 26, 26' runs at a slight angle upwards and rearwards (viewed in the installed condition and in the direction of travel) to reduce space requirements. If two worm gear motors 22, 22' for two table top assemblies are housed in the base carrier 2, the two motors may be arranged one above the other and rotated slightly, as may be seen from FIGS. 4 and 6, and the drive shafts 26, 26' may have different lengths and extend obliquely rearwardly and upwardly to provide a compact unit with minimized space requirements. Apart from the optional minor differences in the first drive devices 11, 11', which allow for a reduction in installation space, the other components of the support arm assemblies 3, the table top devices 4 and the drive devices 13, 16 may be of substantially similar design for both tables and may be arranged mirror inverted to one another. It is also possible to provide only a single first drive device 11 for only a single table top assembly 4.

Figure 7:
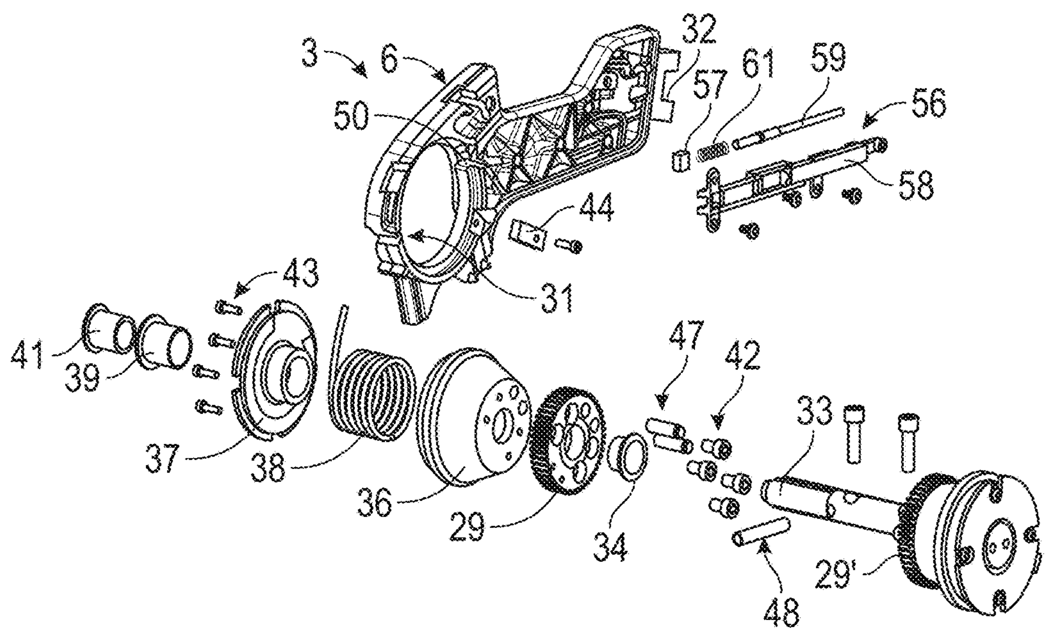
FIG. 7 is an exploded view of an embodiment of a support arm assembly of a folding table arrangement according to the present disclosure.

Referring now to FIG. 7, the support arm assembly 3 is illustrated therein in more detail in an exploded view. The support arm assembly 3 comprises, as an essential element, the support arm 6, which has a circular opening 31 at one end, which serves for pivotal support of the support arm 6. At the opposite, cantilever end of the support arm 6, a hinge part 32 shown in FIG. 7 is formed (see FIGS. 12-14), via which the support arm 6 is pivotally connected to the table top assembly 4 in order to accomplished the folding away and folding in of the table top assembly 4 with respect to the support arm assembly 3.

Returning to FIG. 7 (and with reference to FIGS. 5 and 8), the support arm assembly 3 substantially comprises in the illustrated embodiment a main axis 33, an inner bearing bushing 34, which serves for pivotal support, the worm wheel 29, which is pivotally mounted with respect to the main axis 33, an inner driver element 36, an outer driver element 37, a coil spring 38 interposed between the driver elements 36, 37, an outer bearing bushing 39 for pivotal support, and an outer sleeve 41. The inner bearing bushing 34 is fixed to the inner driver element 36 and is rotatably mounted on the main axis. The outer bearing bushing 39 is fixed to the outer driver element 37 and is rotatably arranged on the outer sleeve 41, which is fixed, e.g. screwed, to the main axle 33.

The worm wheel 29 can be non-rotatably connected to the inner driver element 36 via a screw set 42, while the outer driver element 37 can be screwed to the inner driver element 36 via another screw set 43. The support arm 4 can be clamped between the inner driver element 36 and the outer driver element 37 and can be non-rotatably connected thereto by means of a fixing block 44. As may be seen in particular from FIG. 8, the fixing block 44 is screwed here to the support arm 6 at one end, and with the other end, the fixing block 44 engages in a recess 46 provided on the inner driver element 36 in order to form a positive, non-rotatable connection therewith.

Although the embodiment shown herein provides a support arm 6, an inner driver element 36 and an outer driver element 37, which are formed as separate parts and attached to one another, these elements 6, 36, 37 could in principle also be formed integrally as a one-piece part. However, the multi-part embodiment makes it possible to accommodate the coil spring 38, whose function is explained in more detail below, in the interior space between the inner driver element 36 and the outer driver element 37.

Figure 8:
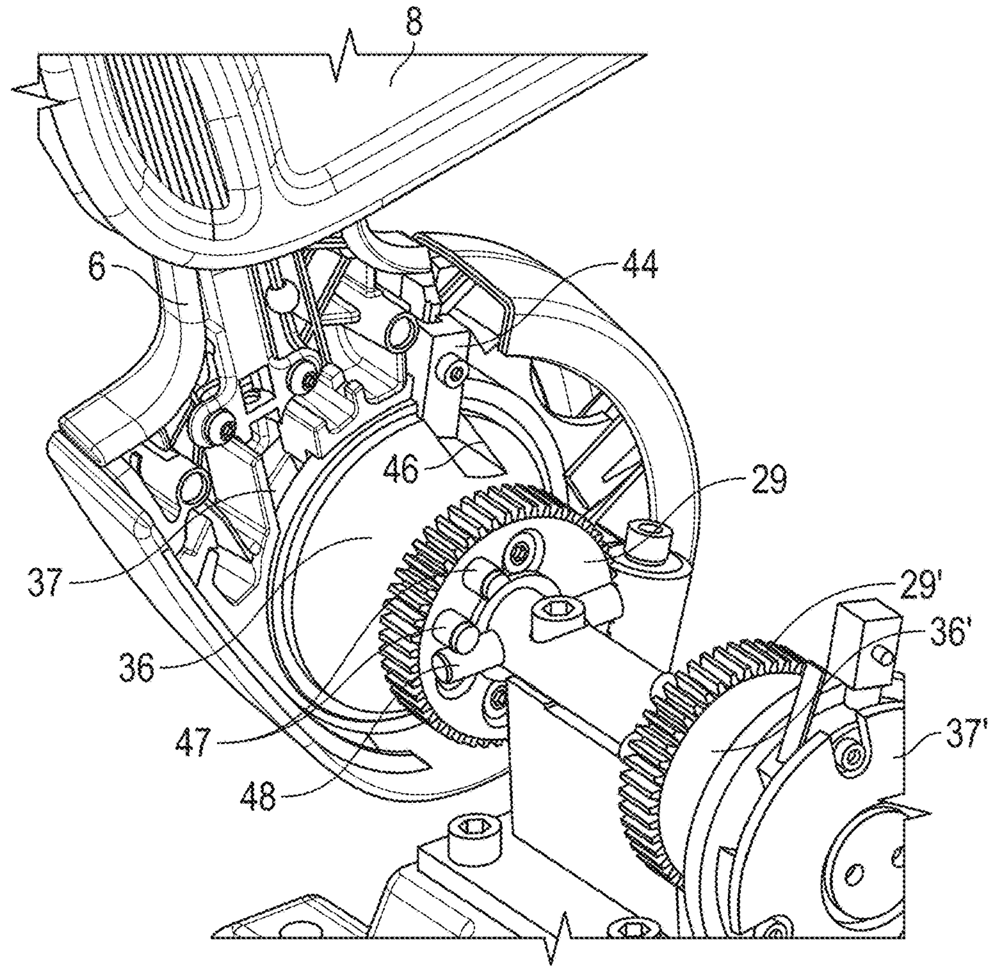
FIG. 8 is a perspective view of the support arm side section of the first drive device, in a closeup representation.
Figure 9:
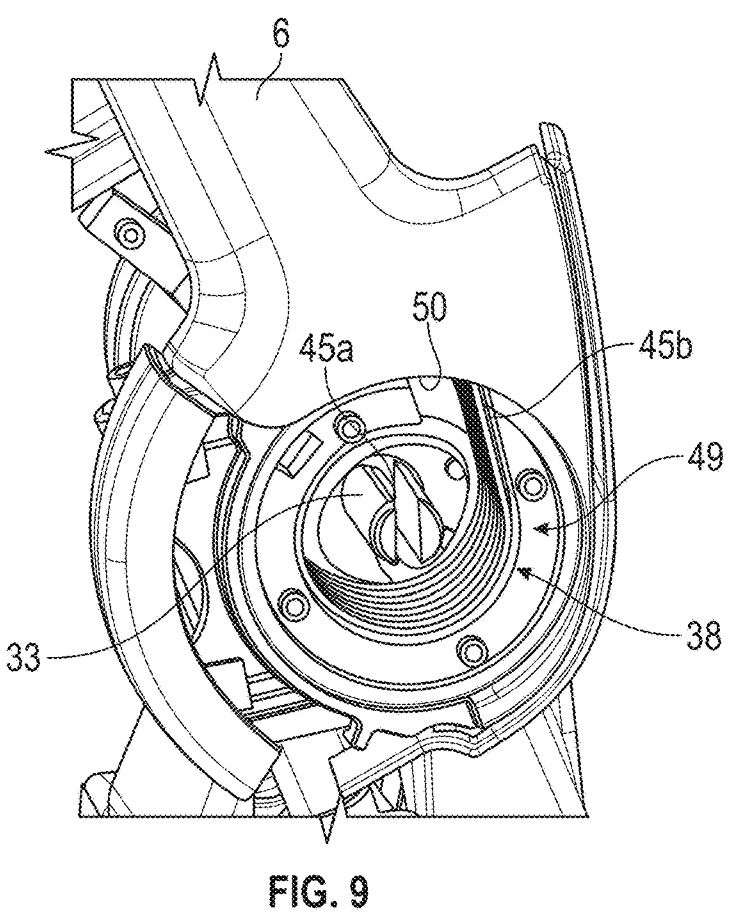
FIG. 9 shows first spring means for supporting an extending movement of the support arm assembly of the folding table arrangement according to the present disclosure, in a partial perspective detail view.

FIGS. 7 and 8 also show that in the illustrated embodiment, a further worm wheel 29' and further inner and outer driver elements 36', 37' are provided, which belong to the further first drive device 11', which is associated with the further table top assembly. These elements 29', 36', 37' do not differ from the elements 29, 36, 37 explained above, so that the above description also applies to them in the same way. The elements 29', 36', 37' may be omitted if the folding table arrangement 1 does not include an additional table top assembly in addition to the table top assembly 4.

End stops may be provided in order to limit the pivot range of the support arm 6 about the first pivot axis A. As may be seen in particular from FIG. 8, the end stops can be located at the pivot point between the worm wheel 29 and the main axis 33. In particular, cylindrical pins 47 may be suitably secured in the face of the worm wheel 29 as stop means in order to set a desired angular range for the pivotal movement. One or more pins may be attached as counter stops to the main axis 33, for example. In the example shown, a pin 48, for example a grooved pin, is provided which penetrates the main axis 33 and engages the cylindrical pins 47 when the worm wheel 29 is rotated. Thus, a desired travel range of at least 90°, preferably 90°-110°, particularly preferably about 100°, may be set. The travel range may be defined as desired, depending on the requirement.

No stop is required for a specific tilt adjustment of the table top 8 of, for example, 30°. The self-locking of the upper, further worm gear 27 is sufficient for this purpose.

The coil spring 38 shown isolated in FIG. 7 forms spring means 49 which is arranged to support a motor-assisted pivoting of the support arm 6 in the sense of an extending movement at least in a certain range. The coil spring 38 is installed slightly pre-tensioned and becomes increasingly tensioned when the folding table arrangement 1 is retracted. This ensures a smooth, jerk-free or low-jerk retracting movement. When the folding table arrangement 1 is extended, the coil spring 38 supports the first motor device 12 by its spring force acting in the same direction of rotation. As may be seen in particular from FIG. 9, which shows a perspective detail view that allows a look into the interior of the inner driver element 36, the coil spring 38 is suspended with one end 45*a* in the main axis 33, while with its other free end 45*b* it engages in a recess 50 formed at the edge of the opening 31 of the support arm 6 and is firmly anchored or supported there on the support arm 6.

Figure 10:
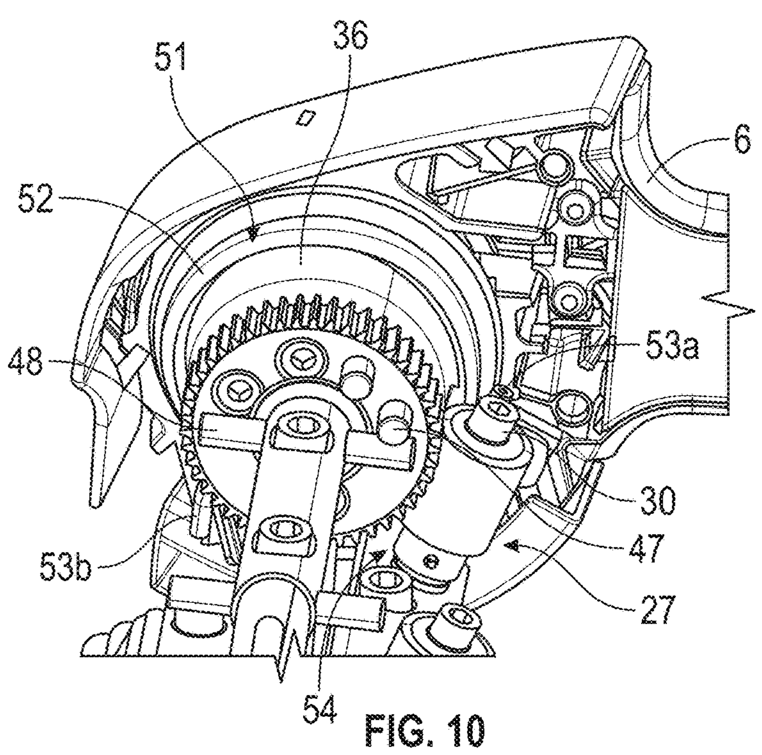
FIG. 10 shows further spring means for supporting a retracting movement of the support arm assembly of the folding table arrangement according to the present disclosure, in a partial perspective detail view.

As may be seen from FIG. 10, which shows a perspective view looking at the worm wheel 29 and the outside of the inner driver element 36, further spring means 51 can optionally be provided, which is arranged to support a motor-assisted pivoting of the support arm 6 in the sense of a retracting movement at least in a certain range. The further spring means 51 is arranged to be tensioned when the folding table arrangement 1 is extended in order to achieve a smoother, jerk-free and/or low-jerk extending movement, and it supports the first motor device 12 when the folding table arrangement 1 is retracted. For this purpose, the further spring means 51 may comprise a further coil spring 52 which is wound over the outer side of at least one of the driver elements 36, 37, here that of the inner driver element 36, is firmly fixed with one end 53*a* to the inner driver element 36 or the support arm 6 and is supported with its other end 53*b* on a rigid bearing section 54 which is fixed to the base carrier 2. The further coil spring 52 does not bear permanently with its free end 53*b* against the bearing section 54, but only comes into contact with the latter in the course of the extending movement and is then increasingly tensioned. Thus, the further coil spring 52 does not act in the entire pivoting range, but only in a partial range thereof. In particular, the further coil spring 52 is effective at the end of an extending movement, but not at the end of a retracting movement.

The two coil springs 38, 52 are thus specifically designed to support extending movements and retracting movements and to prevent stick-slip effects or jerk-slip effects, wherein at the end of an extending movement or retracting movement the coil springs 38, 52 are effective to effectively prevent the support arm 6 from swinging up or overshooting when it reaches the fully extended position or the fully retracted position. Without the two springs, upon reaching one of the end positions, the table top assembly 4 could move beyond its center of gravity due to inertia and the motor and thus cause the table top assembly 4 to overshoot. Such an overshooting of the table top assembly 4 may be effectively prevented by the two counteracting and coordinated coil springs 38, 52. In principle, other spring means than coil springs are also possible in order to fulfill the functionalities explained above. Instead of the spring means 49, 51, suitable damping means could also be provided in order to counteract overshooting of the table top assembly 4. However, the use of the coil springs 38, 52 provides an extremely effective, simple and advantageous solution to the overshoot problem. In principle, at least the further coil spring 52 could be omitted.

Figure 11:
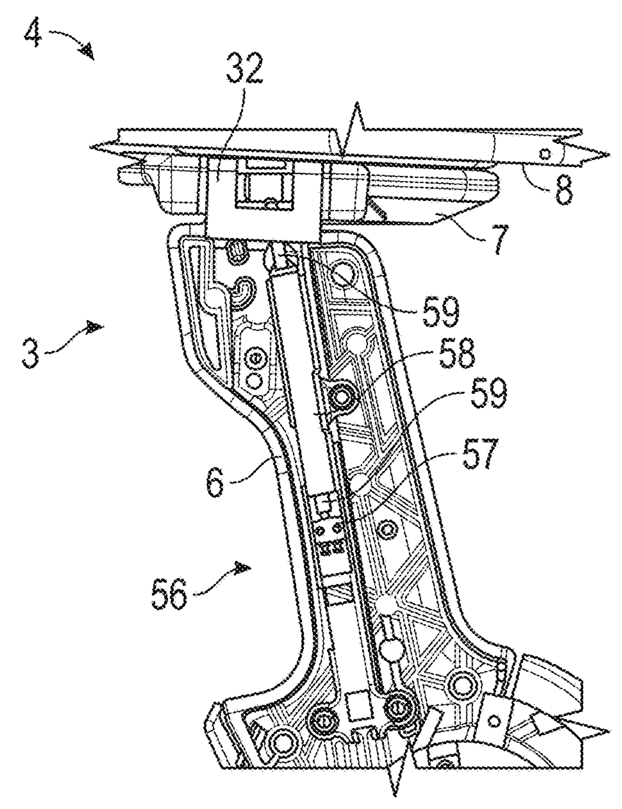
FIG. 11 shows a side view of the support arm assembly with the table top assembly in an unfolded position, in a simplified partial perspective representation.

Referring again to FIG. 7 and further to FIG. 11, it is illustrated that the support arm assembly 3 further comprises a switch arrangement 56 which is arranged to detect and indicate an unfolded position of the table top assembly 4. For this purpose, in the example shown, the switch arrangement 56 comprises a mechanically actuatable switch 57, a guide 58 mounted on the support arm 6, and a push rod 59. The push rod 59 is mounted and guided in the guide 58 in a longitudinally displaceable manner and is biased by a biasing means, in particular a coil spring 61, outwardly in the direction away from the opening 31 of the support arm 6, towards the table top assembly 4. When the table top assembly 4 is in the unfolded position shown in FIG. 11, it pushes the push rod 59 into the guide 58 against the action of the coil spring 61, wherein the inner end of the push rod 59 then reaches and actuates the switch 57 which is also attached to the guide 58. The switch 57 may be arranged, for example, to provide an electrical signal to a control not shown in detail herein, when it is actuated, to indicate that the table top assembly 4 is in the unfolded position. The control may thereupon prevent retraction of the folding table arrangement 1 as long as the table top assembly 4 is in the unfolded position to avoid collision of the table top assembly 4 with other components in the interior of the vehicle, such as a housing or the rear seat console, and possible damage to the folding table arrangement 1 or the vehicle components.

Figure 12:
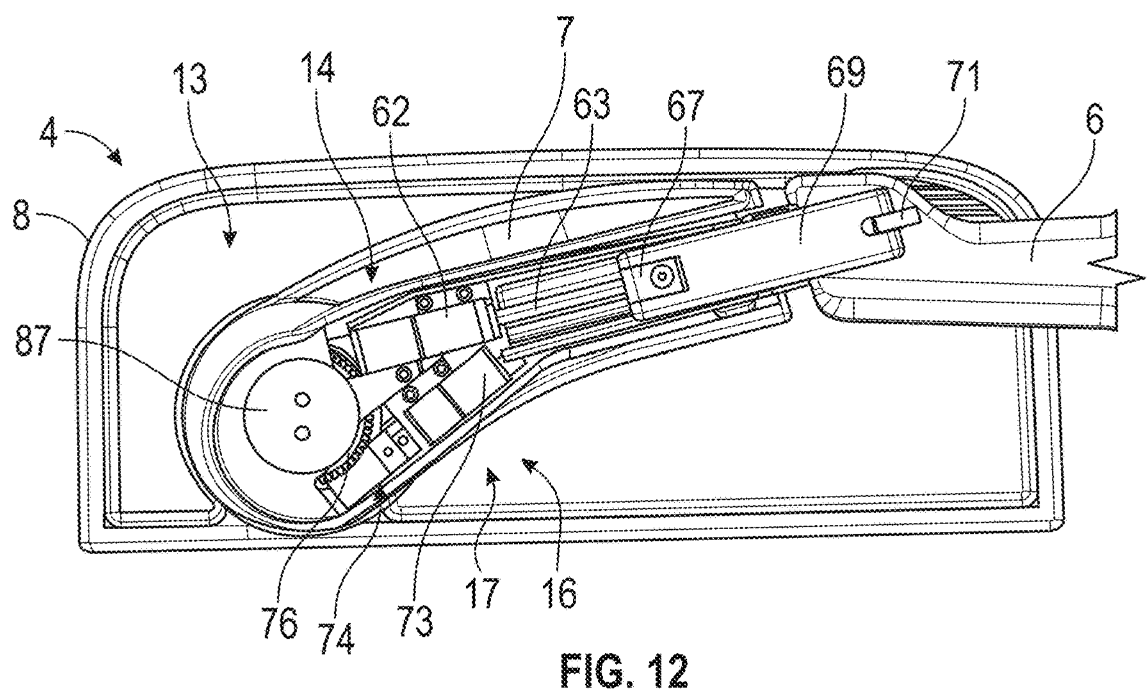
FIG. 12 shows the table top assembly of the folding table arrangement according to the present disclosure in a plan view from below, illustrating second and third drive devices for the table top assembly of the folding table arrangement.
Figure 13:
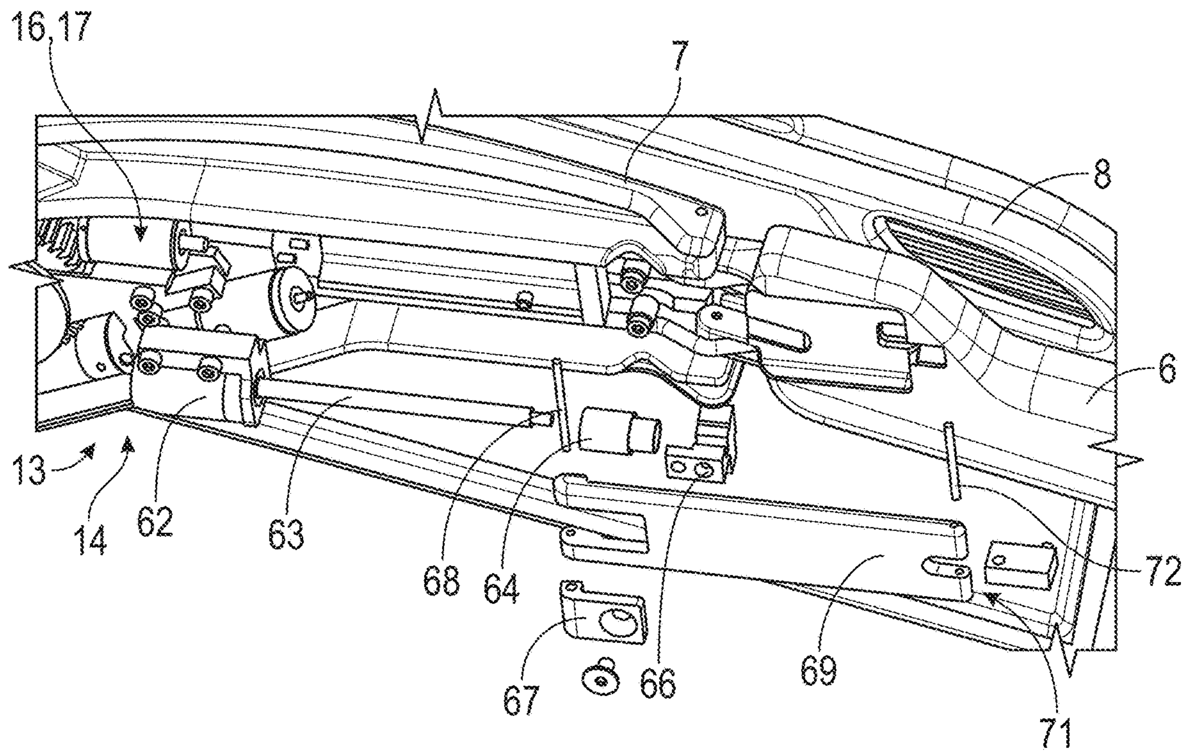
FIG. 13 shows a perspective view of the table top assembly of FIG. 12 in an exploded representation, illustrating the second drive device for a folding movement of the table top assembly.
Figure 14:
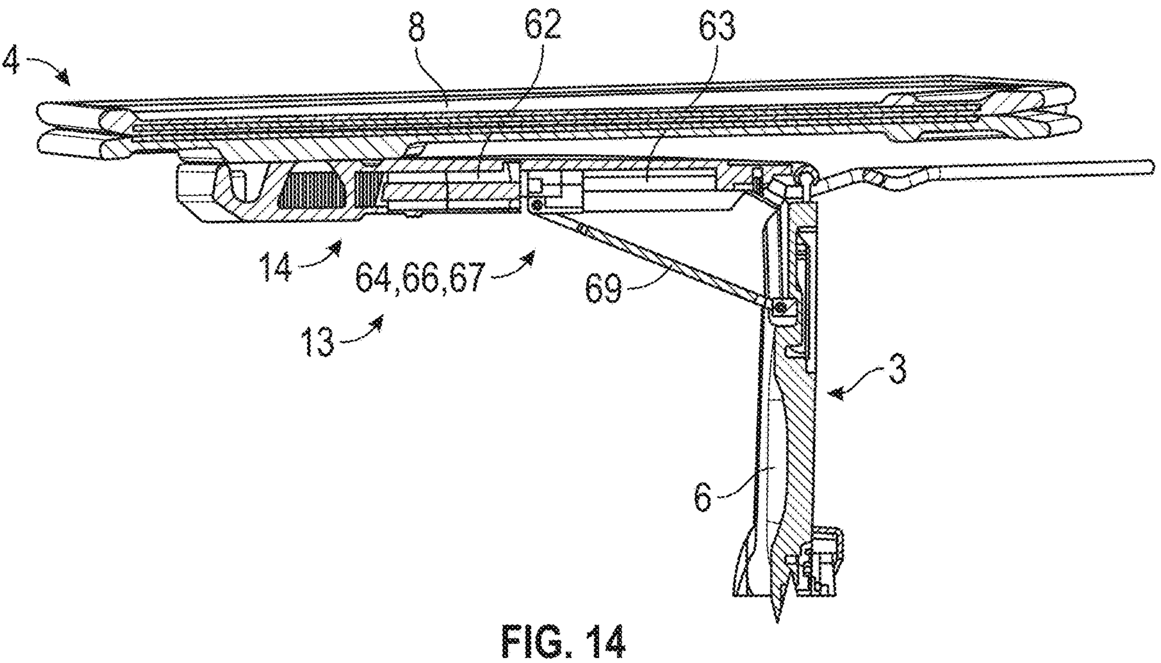
FIG. 14 is a side perspective view showing the table top assembly in the unfolded position.

Referring now to FIGS. 12-14, the second drive device 13 with the second motor device 14 for driving and controlling the pivotal movement of the table top assembly 4 about the second pivot axis B relative to the support arm 6 is shown in therein more detail. As may be seen, the second motor device 14 comprises a threaded spindle 63 which is driven in rotation by a motor 62, in particular an electric motor, and which interacts with a spindle nut 64 in order to convert a rotational movement of the threaded spindle 63 into a linear movement of the spindle nut 64. The spindle nut 64 is attached to a bearing block 66 and is mounted in a longitudinally displaceable manner with respect to the holding arm 7 and the table top 8. A joint 67 having a joint axis 68 is also attached to the bearing block 66. The second drive device 13 further comprises a supporting beam 69 which is connected at one end via the joint 67 to the bearing block 66 and thus to the holding arm 7 of the table top assembly 4 in a relatively pivotable manner. As a result, the supporting beam 69 is also drivingly connected via the joint 67 to the spindle nut 64 and is guided by the spindle nut 64 in a displaceable manner along the holding arm 7. At its other end, the supporting beam 69 is pivotally connected to the support arm 6 via a further joint 71 and a further joint axis 72.

When the second motor device 14 rotates, the bearing block 66 with the spindle nut 64 is moved linearly over the threaded spindle 63, thereby driving the support arm 69 via the joint 67 so that the table top assembly 4 is folded or unfolded about the second pivot axis B depending on the direction of rotation of the motor 62 of the second motor device 14. The supporting beam 69 can pivot about the further joint axis 72 with respect to the support arm 6 via the further joint 71 in order to achieve the folding movement. During the folding movement and in the fully unfolded position, the holding arm 7 is supported against the support arm 6 by the supporting beam 69 via the joint 67.

The motor 62 is preferably arranged in such a way that it switches off when predetermined maximum current limits of the motor current are exceeded upon reaching end positions at which the spindle nut 64 is prevented from continuing to run. Even if the end positions are not reached, the motor 62 switches off as soon as the motor current limit is reached in order to ensure anti-trapping protection.

FIG. 12 shows the table top assembly 4 in the folded position (as in FIGS. 2*a*, 2*b*), in which both the table top 8 and the supporting beam 69 are substantially parallel to the support arm 6, while FIG. 14 shows the table top assembly 4 in the unfolded position (as in FIGS. 1, 2*c*, 2*d*), in which the table top 8 is oriented substantially perpendicular to the support arm 6 and the supporting beam 69 is oriented obliquely to the table top assembly 4 and the support arm 6 to form a cross bracing and to support the table top assembly 4 against the support arm 6.

Figure 15:
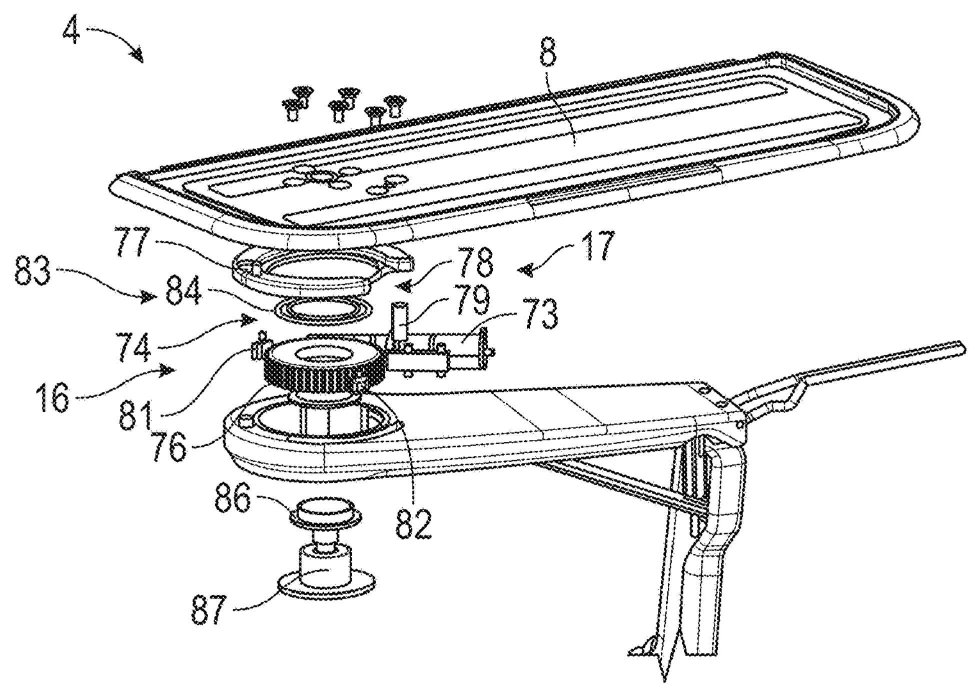
FIG. 15 shows the table top assembly of the folding table arrangement according to the present disclosure, illustrating the third drive device for rotating a table top, in an exploded view.
Figure 16:
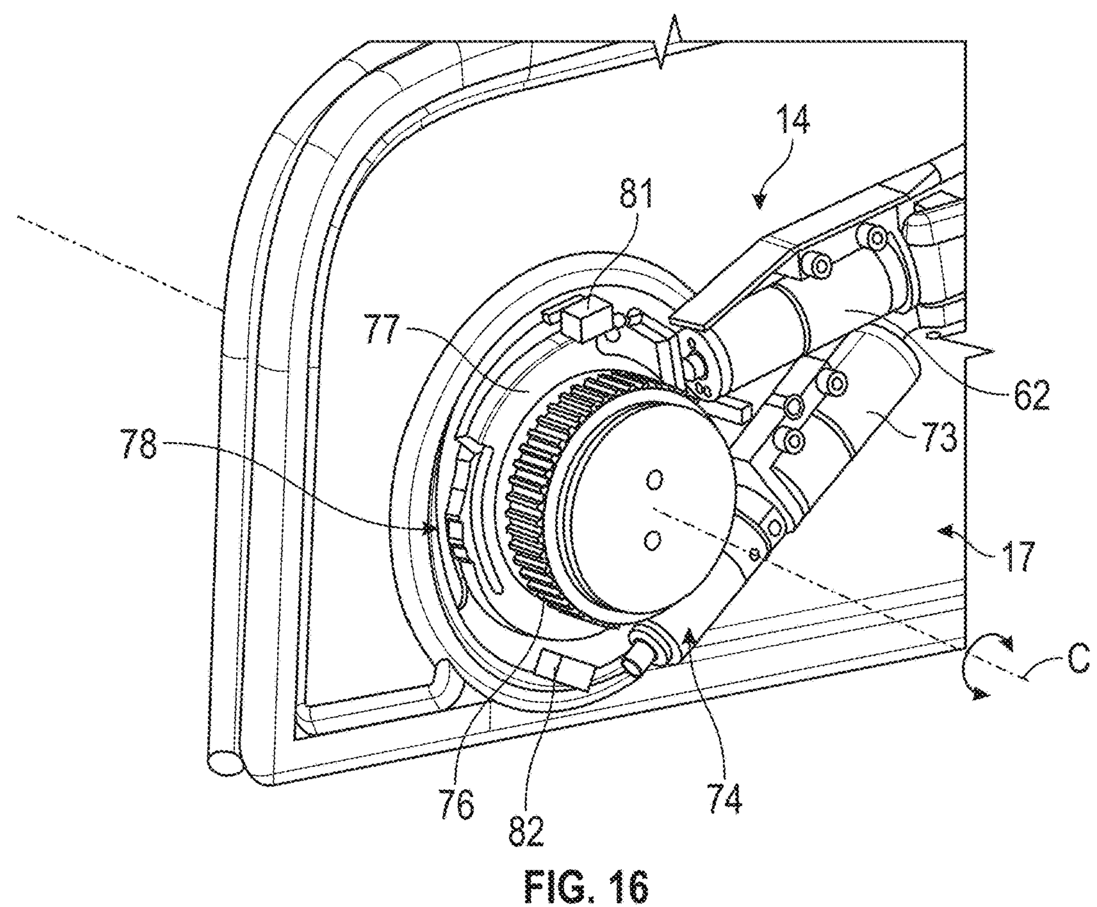
FIG. 16 is a perspective view from below of the table top assembly with the third drive device of the folding table arrangement according to the present disclosure, in a partial detailed representation.

Referring now in particular to FIGS. 12, 15 and 16, the third drive device 16 with the third motor device 17 for driving and controlling the rotational movement of the table top 8 about the rotational axis C relative to the holding arm 7 will be described in more detail below. In principle, a rotational movement of the table top 8 could also be carried out manually, although the motor-assisted rotational movement of the table top 8 is preferred because it provides additional comfort and, together with the pivotal movements of the support arm assembly 3 and the table top assembly 4, facilitates a fully automated, electrically operated setting up of the folding table arrangement 1 into the position of use or into a position suitable for stowage in a storage space.

In the illustrated embodiment, the third motor device 17 comprises a third motor 73, in particular an electric motor or worm gear motor, including a third worm gear 74. In the preferred embodiment shown herein, the third worm gear 74 is self-locking.

It should be noted that the terms "first", "second", "third", etc., used herein do not denote any order or importance of the mentioned elements, but rather are used to distinguish one element from one or more other similar or identical elements to distinguish and to facilitate reference. The description of a "second" element or a "third" element or the like also does not imply the presence of a "first" such element or both a "first" and a "second" such element or the like.

Referring now in particular to FIG. 15, the table top assembly 4 with the third drive device 16 is shown therein in an exploded view with its components in detail. The table top assembly 4 includes, in particular, the holding arm 7, the table top 8 and the third motor 73 with the third worm gear 74, which includes a worm wheel 76. The table top assembly 4 also includes a ring 77 attached to the underside of the table top and having an end position latching device 78 which provides mechanical end stops for the end positions for the rotation of the table top 8, which are offset by 180°. An associated latching bolt 79, which interacts with the end position latching device 78 to define the end positions, is rigidly attached to the holding arm 7 together with the third motor 73.

A first switch 81 and a second switch 82 are further provided for the rotational end positions of the table top 8 to the motorized rotation of the table top 8. As may also be seen in particular from FIG. 16, the end position switches 81, 82 are arranged on the ring 77 and thus on the table top 8 at positions offset by 180° with respect to the rotational axis C. The first switch 81 may be associated with the turned-in end position of the table top 8, while the second switch 82 may be associated with the turned-out end position rotated by 180°. When the folding table arrangement 1 is actuated electrically, the table top 8 is rotated via the third worm gear 74 until one of the first end position switch 81 and the second end position switch 82 is reached. The respective end position switch 81, 82 may then provide an electrical signal to the control indicating that the respective rotational end position has been reached, whereupon the control may stop the third motor 73.

In the illustrated preferred embodiment of the folding table arrangement 1 according to the present disclosure, a slipping clutch 83 is arranged between the worm wheel 76 of the third worm gear 74 and the table top 8. The slipping clutch 83 makes it possible, to manually rotate the table top 8 relative to the worm wheel 76 of the third worm gear 74 by applying an external force. When the table top 8 is rotated by motor, a person may apply a force with a certain minimum load to the table in order to stop the table top 8 or even rotate it in the opposite direction to the direction of rotation of the third motor 73. It is thus possible to prevent a passenger from being injured when the motor is actuated or in the event of any other impact caused by a collision of the passenger with the table top 8. Anti-trap protection is also provided in this manner. In addition, the passenger may quickly set or adjust the rotational position of the table manually at any time.

In the illustrated embodiment, the slipping clutch 83 includes two O-rings 84 which are interposed and slightly clamped between the table top 8 and the worm wheel 76 of the third worm gear 74 as a damping device. The worm wheel 76 is rotatably mounted on a slide bearing 86 which is held by a bolt 87. The bolt 87 is screwed to the table top 8 in abutment and the worm wheel 76 is free to rotate on or relative to the bolt 87. When the worm wheel 76 turns, the table top 8 is carried along via the O-rings 84, which are used for damping. However, the passenger has the ability to stop the table top 8 or further adjust it manually.

The folding table arrangement 1 described so far operates as follows:

It is assumed that the folding table arrangement 1 is in the state shown in FIG. 2*a*, in which the support arm assembly 3 is fully retracted, the table top assembly 4 is folded in, and the table top 8 is folded closed and rotated into a basic position. If the folding table arrangement 1 is now to be transferred into the position of use, the passenger may press a suitable control means, in the simplest case a button on a control panel or controller, in order to bring about an automatic set-up process for the folding table arrangement 1 into the position of use. A control, not shown herein, then controls the first drive device 11, the second drive device 13 and the third drive device 16 in a suitable manner in order to carry out the set-up process. The first drive device 11 moves the support arm assembly 3 into the fully extended position shown in FIG. 2*b*, in which the support arm assembly 3 protrudes substantially vertically upwards. The second drive device 13 folds out the table top assembly 4 into the unfolded position shown in FIG. 2*c*, in which the table top 8 lies in a substantially horizontal plane. The third drive device 16 turns the table top 8 by motor from the rotational position shown in FIG. 2*c* into the rotational position shown in FIG. 2*d*, rotated by 180°. In this position, if the table top 8 has two foldable table top halves 8*a*, 8*b*, a user may then fold open the table top halves to create a table top 8 with an enlarged table surface area as illustrated in FIG. 1.

If required, the table top 8 could also be brought into a slightly tilted position, if this is desired. For this purpose, any desired tilt of the support arm 6 and the table top assembly 4 can be set up by motor. Any rotational position of the table top 8 can also be adjusted by motor. The rotational position of the table top 8 can also be adjusted manually.

If the folding table arrangement 1 is to be stowed again in a storage space, for example in a rear seat console of a motor vehicle, the drive devices 11, 13, 16 are actuated in the reverse sense by the control, when controlled or triggered by the user, in order to automatically turn in, fold in and retract the folding table arrangement 1 into the position shown in FIG. 2*a*.

Advantageously, the setting up and stowage of the folding table arrangement 1 may be accomplished in a completely automated and controlled manner by the drive devices 11, 13 and 16. There is no risk of operating the folding table arrangement 1 incorrectly and no risk of damaging components of the folding table arrangement 1 or the vehicle or of injuring the operator. The motor-assisted folding table arrangement 1 is characterized by its ease of use and high level of comfort. It may be set up and stowed away easily and quickly with a relatively simple construction, can be used flexibly, and is robust and durable.

It should be noted that the individual operations of extending the support arm assembly 3, unfolding the table top assembly 4, and rotating the table top 8 have been described herein as being performed sequentially, one after the other, for convenience and illustration only. The control of the folding table arrangement 1 according to the present disclosure may advantageously be implemented in such a way that it operates the first, second and third drive devices 11, 13, 16 largely in parallel in order to control the extending and retracting movement of the support arm assembly 3, the folding and unfolding movement of the table top assembly 4 and the rotational movement of the table top 8 as parallel as possible, at the same time. For example, the control may instruct the second drive device 13 and the third drive device 16 to fold and rotate the table top assembly largely in parallel and simultaneously as soon as or as long as the support arm assembly 3 is sufficiently outside a storage space so that these folding and rotating movements are permitted. This allows for very quick operations to set up or stow the folding table arrangement 1 with coordinated, smooth movements of all components, which additionally contributes to the pleasing aesthetics of the folding table arrangement 1 according to the present disclosure.

An electrically operated folding table arrangement 1 for a vehicle, in particular a motor vehicle, comprises a base carrier 2, a support arm assembly 3 coupled to the base carrier 2 and including a support arm 6 which is pivotally mounted about a first pivot axis A, and a table top assembly 4 which is coupled to the support arm 3 and is pivotable relative to the support arm 3 about a second pivot axis B. The table top assembly 4 includes a holding arm 7 hinged to the support arm 6 and a table top 8 rotatably mounted on the holding arm 7 about a rotational axis C. Each pivot axis A, B is assigned a drive device 11, 13 with a motor device 12, 14 for driving and controlling the respective pivotal movement about the respective pivot axis A, B. A further motor-assisted drive device 16 can be provided for driving and controlling the rotational movement of the table top 8 about the rotational axis C.

What is claimed is:

1. A folding table arrangement for a vehicle comprising:

a base carrier;

a support arm assembly coupled to the base carrier and including a support arm which is pivotally mounted about a first pivot axis and is pivotable between a retracted and an extended position, the support arm assembly being assigned a first drive device which includes a first motor device for driving and controlling pivotal movement of the support arm about the first pivot axis relative to the base carrier; and a table top assembly coupled to the support arm, the table top assembly being pivotally arranged relative to the support arm about a second pivot axis different from the first pivot axis, wherein the table top assembly is pivotable between a folded position and an unfolded position, the table top assembly comprising a second drive device including a second motor device for driving and controlling pivotal movement of the table top assembly about the second pivot axis relative to the support arm;

the table top assembly comprising a holding arm hinged to the support arm and a table top rotatably mounted on the holding arm about a rotational axis different from the first pivot axis and the second pivot axis;

wherein a spring means is arranged and configured to support a motor-driven pivoting of the support arm in the sense of an extending movement at least in a certain range;

wherein a further spring means is arranged and configured to support a motor-driven pivoting of the support arm in the sense of a retracting movement at least in a certain range; and wherein the further spring means comprises a further coil spring which is suspended at one end in a driver element of the support arm assembly and an other end of which is configured to bear against a rigid bearing section.

2. The folding table arrangement according to claim 1, wherein the base carrier comprises two parallel carrying legs which are connected to one another via a cross member, the cross member having a receiving space for accommodating the first motor device.

3. The folding table arrangement according to claim 1, wherein the first motor device is designed as a worm gear motor with a first motor and a non-self-locking worm gear.

4. The folding table arrangement of claim 3, wherein the first drive device includes a drive shaft having one end drivingly connected to the worm gear motor and an other end of which is drivingly connected to the support arm assembly via a further worm gear in order to rotate the support arm about the first pivot axis relative to the base carrier when the worm gear motor is actuated.

5. The folding table arrangement according to claim 4, wherein the further worm gear is designed as a self-locking gear and comprises a worm on which means are arranged that may be gripped from the outside with a tool in order to operate the further worm gear manually.

6. The folding table arrangement according to claim 1, wherein the support arm assembly comprises a main axis and at least one driver element rotatably mounted on the main axis, which is driven in rotation by the first drive device and is non-rotatably connected to the support arm.

7. The folding table arrangement according to claim 1, wherein stop means are provided which limit a pivoting range of the support arm about the first pivot axis.

8. The folding table arrangement according to claim 1, wherein the spring means comprises a coil spring which is suspended at one end in a main axis and an other end of which is configured to bear against a recess in the support arm.

9. The folding table arrangement according to claim 1, wherein the second motor device comprises a threaded spindle driven in rotation by a motor, the threaded spindle interacting with a spindle nut coupled to the holding arm of the table top assembly to convert a rotational movement of the threaded spindle into a linear movement of the spindle nut.

10. The folding table arrangement according to claim 9, wherein the second drive device comprises a supporting beam which is hinged at one end to the support arm and is relatively pivotally and slidably connected at its other end to the holding arm of the table top assembly via a joint, wherein the supporting beam is further drivingly connected to the spindle nut via the joint so as to be displaced by the spindle nut along the holding arm.

11. The folding table arrangement according to claim 9, wherein the motor of the second motor device is arranged to switch off if predetermined maximum current limits for the motor are exceeded upon reaching end positions.

12. The folding table arrangement according to claim 1, wherein a switch is arranged and configured to be actuated when the table top assembly is in an unfolded position.

13. The folding table arrangement according to claim 12, wherein the switch is attached to the support arm and the support arm further supports a movably arranged push rod which is arranged and configured to engage the table top assembly at one end and thereupon to actuate the switch with its other end.

14. The folding table arrangement according to claim 1, wherein the table top assembly includes a third drive device comprising a third motor device for driving and controlling rotational movement of the table top about the rotational axis relative to the holding arm.

15. The folding table arrangement according to claim 14, wherein the third drive device includes a third motor with a self-locking third worm gear.

16. The folding table arrangement according to claim 14, wherein the third drive device comprises at least one end position switch.

17. A folding table arrangement for a vehicle comprising:

a base carrier;

a support arm assembly coupled to the base carrier and including a support arm which is pivotally mounted about a first pivot axis and is pivotable between a retracted and an extended position, the support arm assembly being assigned a first drive device which includes a first motor device for driving and controlling pivotal movement of the support arm about the first pivot axis relative to the base carrier; and a table top assembly coupled to the support arm, the table top assembly being pivotally arranged relative to the support arm about a second pivot axis different from the first pivot axis, wherein the table top assembly is pivotable between a folded position and an unfolded position, the table top assembly comprising a second drive device including a second motor device for driving and controlling pivotal movement of the table top assembly about the second pivot axis relative to the support arm;

the table top assembly comprising a holding arm hinged to the support arm and a table top rotatably mounted on the holding arm about a rotational axis different from the first pivot axis and the second pivot axis;

wherein the table top assembly includes a third drive device comprising a third motor device for driving and controlling rotational movement of the table top about the rotational axis relative to the holding arm;

wherein the third drive device includes a third motor with a self-locking third worm gear; and wherein a slipping clutch is arranged between the self-locking third worm gear and the table top to allow the table top to be rotated relative to the third motor device, by an external force.

18. The folding table arrangement according to claim 17, wherein the slipping clutch comprises a damping device which includes at least one O-ring interposed between the third worm gear and the table top.

* * * * *